United States Patent [19]

Lewis

[11] 4,001,668

[45] Jan. 4, 1977

[54] ELECTRIC SHAVER OPERABLE FROM A WIDE RANGE OF SUPPLY VOLTAGES

[75] Inventor: Robert E. Lewis, Peach Bottom, Pa.

[73] Assignee: Schick, Incorporated, Lancaster, Pa.

[22] Filed: Nov. 16, 1973

[21] Appl. No.: 416,591

[52] U.S. Cl. .................................. 323/19; 321/18; 323/22 T; 323/39

[51] Int. Cl.² .......................................... G05F 5/00

[58] Field of Search ............ 307/146, 318; 322/28; 323/22 Z, 19, 22 T, 22 SC, 36, 39; 321/16, 18

[56] References Cited

UNITED STATES PATENTS

| | | | |
|---|---|---|---|
| 3,214,668 | 10/1965 | Brinster | 323/22 Z |
| 3,376,496 | 4/1968 | Lund et al. | 322/28 |
| 3,383,563 | 5/1968 | Wright | 322/28 X |

Primary Examiner—A. D. Pellinen
Attorney, Agent, or Firm—Lockwood, Dewey, Zickert & Alex

[57] ABSTRACT

A motor-driven electric shaver operable over a wide range of alternating line voltages includes a capacitor for supplying unidirectional current to the motor. The capacitor is periodically charged through a current switching device serially located between the line and the capacitor. The switching device is rendered conductive only when the instantaneous voltage level of the applied line current is less than a predetermined level such that the average voltage developed across the capacitor and applied to the motor corresponds to the nominal requirements of the motor. Since the switching device is operated in either a saturated or nonsaturated state, power dissipation within the shaver is minimized.

12 Claims, 7 Drawing Figures

ELECTRIC SHAVER OPERABLE FROM A WIDE RANGE OF SUPPLY VOLTAGES

BACKGROUND OF THE INVENTION

The present invention relates generally to motor-driven electrical appliances such as electric shavers, and particularly to circuit means for use in such appliances which allow the appliances to automatically operate from electrical mains having a wide range of voltage levels.

With the present trend toward increased foreign travel the need has arisen for portable appliances operable from both the 110–120 volt mains or lines prevalent in the United States and North America, and from the higher 220–240 volt lines prevalent in Europe and much of the rest of the world. While this capability can invariably be obtained by the inclusion of multiple windings on the electric motor of the appliance, or by the inclusion of various types of resistance networks within the appliance, such circuits have heretofore been undesirably expensive and have necessitated that the user make a voltage selection prior to use of the appliance. Frequently, and particularly where the user is unfamiliar with the appliance or the voltage level of the lines in a foreign country, the appliance may be subjected to an over-voltage condition which may result in permanent damage to the appliance.

Accordingly, the need has arisen for a power supply circuit for use in electrical appliances which will automatically condition the appliances to operate from a variety of line voltages. Ideally, such a circuit would require no pre-selection of line voltage whatsoever by the user, would be economical to manufacture so as to not unduly cost-burden the appliance in the highly competitive appliance industry, and would not unduly add to the weight or detract from the reliability of the appliance. Furthermore, such a circuit would preferably provide minimal heat dissipation, allowing the shaver to run cool even after extended periods of use.

Therefore, it is a general object of the present invention to provide new and improved circuit means for an electrical appliance whereby the appliance may be operated over a wide range of line voltages.

It is another object of the present invention to provide new and improved circuit means for an electrical appliance which automatically condition the appliance to operate over a wide range of line voltages.

It is another object of the present invention to provide new and improved circuit means for an electrical appliance of the type having an electrical motor wherein the speed for the motor is maintained substantially constant over a wide range of line voltages.

It is another object of the present invention to provide economical circuit means for an electric shaver which allow the shaver to operate from a wide range of source voltages with minimum heat dissipation and with no manual pre-selection of source voltage.

SUMMARY OF THE INVENTION

The invention is directed, in an electrical appliance of the type including a DC motor operable from an applied unidirectional current having a predetermined nominal voltage level, to circuit means for operating the motor from an alternating current source having a predetermined range of voltage levels. The circuit means comprises means including an energy storage device for producing from a series of applied current pulses having a predetermined peak voltage amplitude a DC output current at the nominal voltage level of the motor for application to the motor. Means including a switch device having main electrodes and a control electrode are included for supplying current from the alternating current source to the energy storage device, the conduction rate of the switch device being dependent on a control effect applied to the control electrode, and means comprising a control circuit responsive to the instantaneous voltage level of the alternating current source are provided for applying a control effect to the control electrode to render the switch device conductive to apply current from the alternating current source to the energy storage device when the instantaneous voltage level of the alternating current does not exceed the desired predetermined peak voltage amplitude of the current pulses.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
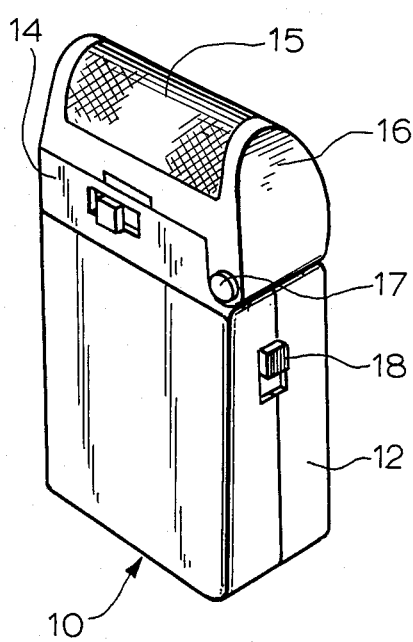
FIG. 1 is a perspective view of a motor-driven electric shaver incorporating circuit means constructed in accordance with the invention.

Although it will be appreciated that the circuit means of the present invention can be constructed in various forms for use in conjunction with various types of electrical appliances, these circuit means find particular utility in connection with a motor-driven electrical shaver of the type intended for use over a wide range of supply voltages, such as the electric shaver shown in FIG. 1.

Figure 2:
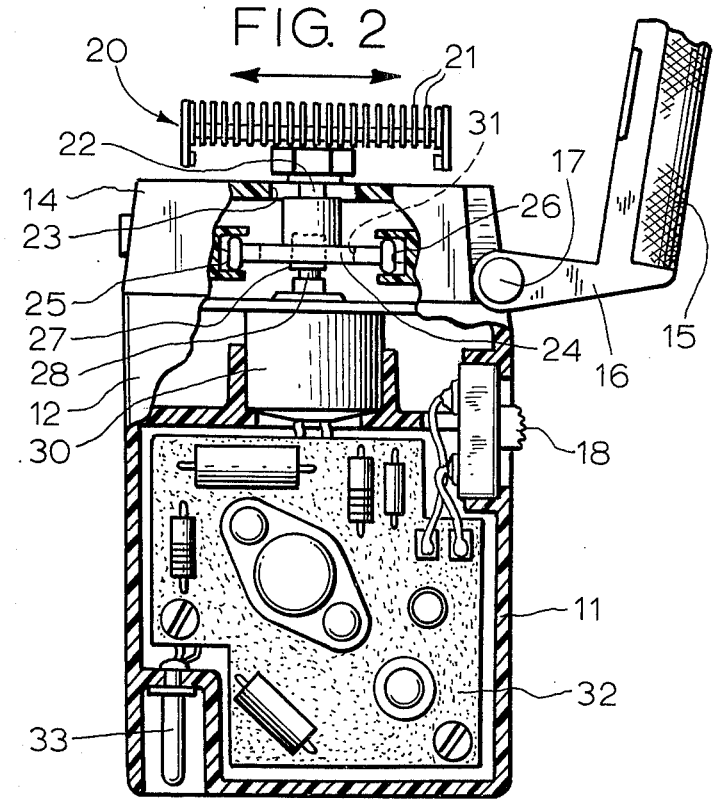
FIG. 2 is a side elevational view of the electric shaver of FIG. 1 showing the stationary head comb of the shaver opened and the body of the shaver partially broken away to show the internal circuit elements of the shaver.

Referring now to the figures in greater detail, and particularly to FIGS. 1 and 2, the electric shaver 10 is seen to comprise a housing 11 having a generally rectangular body portion 12 and a rounded head portion 14. The head portion 14 includes a transversely extending work surface or comb 15 which may be fabricated of thin perforated metal or other suitable material. The comb, which is preferably flexible and rounded along its top edge to obtain optimum contact with the skin surface to be shaved, is held in position by a comb frame 16, which is preferably pivotably mounted at one end to the head portion 14 of housing 11 by means of a hinge pin 17 or other suitable fastening means. An ON-OFF power switch 18 may be provided at one side of body portion 12 for controlling the application of electrical power to the shaver.

As shown in FIG. 2, comb 15, and comb frame 16 may be pivoted to an open position to gain access to a cutter blade assembly 20, which is disposed beneath comb 15, for cleaning, repair or replacement. The cutter blade assembly 20, which comprises a plurality of individual vertical spaced-apart blades 21, is removably mounted to a support stem 22 which serves to urge the cutting edges of the blades 21 into engagement with the undersurface of comb 15 when the comb is in its closed position, and to impart the desired reciprocative motion to the blades during operation of the shaver.

Support stem 22 extends through a transversely elongated slot 23 provided in housing 11 and into engagement with a slidably mounted actuator member 24. A pair of opposed channels 25 and 26 are molded into opposite sides of housing 11 to define a transverse reciprocative path for actuator member 24.

In operation, actuator member 24 is reciprocatively driven along the path defined by channels 25 and 26 by means of an eccentric cam 27 which is carried on the drive shaft 28 of a motor 30, which may be a conventional DC permanent-magnet motor of the type commonly used in electric shavers. The cam 27 engages a drive slot 31 molded into actuator member 24 so that when the cam 27 is rotated by motor 30 the actuator member 24 is forced to reciprocate back and forth. By reason of the mechanical coupling provided by support stem 22 to cutter blade assembly 20, the individual cutter blades 21 carried thereon reciprocate against the undersurface of comb 15 to provide the desired shearing action.

Motor 30 may in a typical application be designed to operate at a nominal speed of 8000 rpm with a predetermined nominal voltage of 100 VDC applied to its input terminals. However, it will be appreciated that in other applications greater or lesser nominal speeds may be desirable with greater or lesser nominal voltages applied to the motor.

In accordance with the invention, electric shaver 10 is provided with novel circuit means for supplying operating power to motor 30 such that motor 30 will operate at a substantially constant speed, notwithstanding wide variations in the line volage applied to the shaver. These circuit means include the user-operated ON-OFF control switch 18, certain components mounted on a circuit board 32 (FIG. 2) within the shaver housing, and a recessed male connector 33 contained at the bottom of housing 11 for establishing a connection to a power cord (not shown) which connects to the line. The body portion 12 of housing 11, which may consist of two half sections joined together, is preferably constructed of an electrically-insulated high-impact plastic and may include suitable internal ribbing for supporting motor 30 and the other internal components of the shaver.

Figure 3:
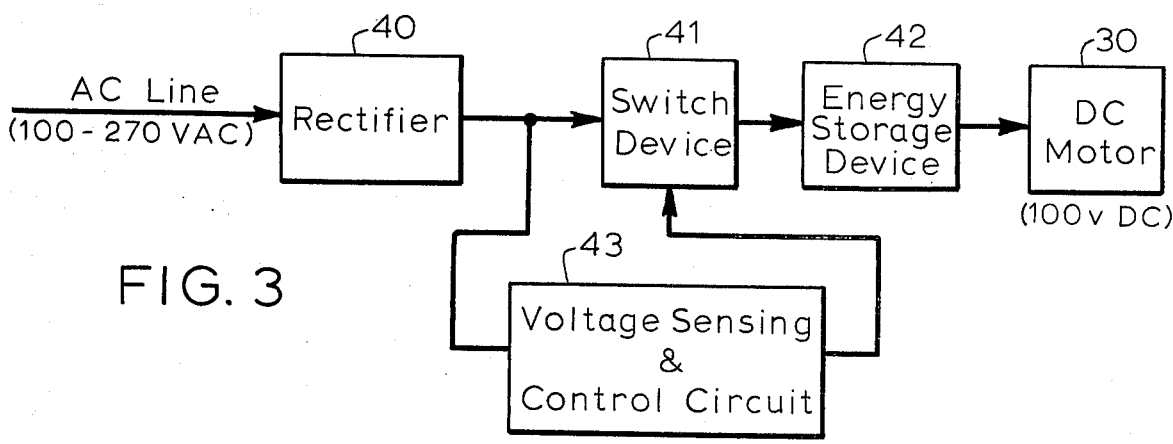
FIG. 3 is a functional block diagram of circuit means constructed in accordance with the invention for use in the electric shaver of FIG. 1.

Referring now to the functional block diagram of FIG. 3, the circuit means employed in shaver 10 for supplying operating power to motor 30 is seen to comprise a rectifier 40 for converting the applied alternating line current to a pulsating unidirectional current, the voltage level of which varies directly with variations in the input line voltage. The pulsating unidirectional current developed by rectifier 40 is coupled or conducted by a switch device 41 to an energy storage device 42, wherein it is converted to a continuous direct current suitable for application to the DC motor 30 of the electric shaver. The conduction state of switch device 41, i.e. conductive or non-conductive, is dependent on an applied control effect, which is developed within a voltage sensing and control circuit 43. As will be explained in detail presently, control circuit 43 senses the instantaneous voltage level at the output or rectifier 40 and generates an appropriate control effect which conditions switch device 41 to conduct only when the instantaneous voltage level at the output of rectifier 40 is less than a predetermined threshold level, such that the voltage level of the continuous direct current developed by energy storage device 42 corresponds to the nominal voltage level required by motor 30.

Figure 4:
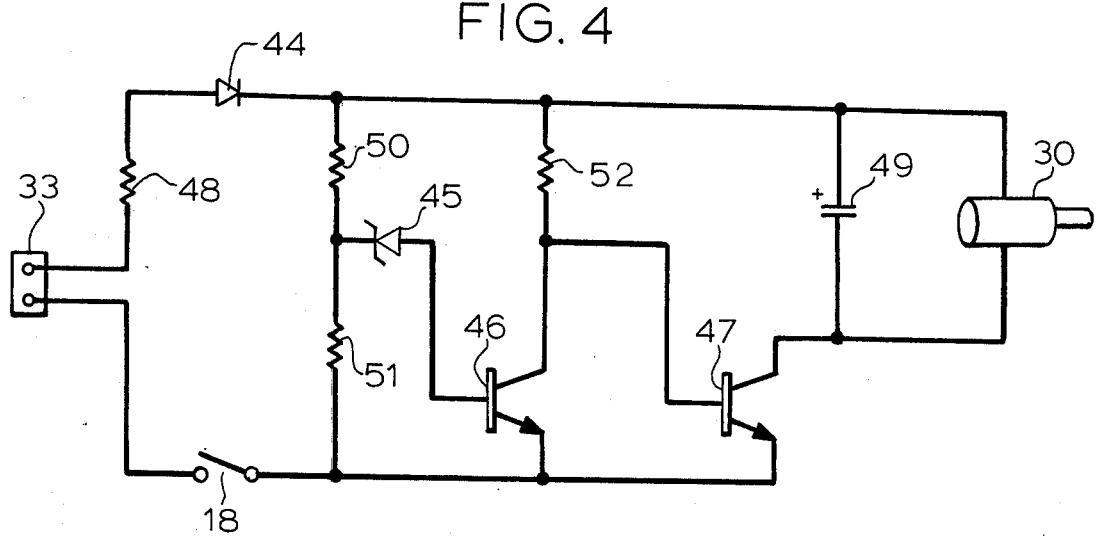
FIG. 4 is a schematic diagram of an electric circuit for motor-driven appliances constructed in accordance with the invention.

A preferred circuit arrangement for converting the AC line current applied to connector 33 to a constant-voltage unidirectional current suitable for application to motor 30 is shown schematically in FIG. 4. This circuit includes a rectifier diode 44, a zener diode 45, a first NPN transistor 46 and a second NPN transistor 47. The anode of diode 44 is connected by a series current-limiting resistor 48 to one terminal of connector 33. The cathode of diode 44 is connected to one input terminal of motor 30. The other input terminal of motor 30 is connected to one main electrode, the collector, of transistor 47. The other main electrode, the emitter, of transistor 47 is connected through the user-actuated ON-OFF switch 18 to the remaining terminal of connector 33. An energy storage device in the form of a capacitor 49 is connected across the input terminals of motor 30.

A voltage divider comprising series-connected resistors 50 and 51 is connected from the cathode of diode 44 to switch 18. The anode of zener diode 45 is connected to the juncture of these resistors, and the cathode of diode 45 is connected to the control electrode, or base, of transistor 46. One main electrode, the collector, of transistor 46 is connected to the control electrode, or base, of transistor 47, and is further connected by a resistor 52 to the cathode of diode 44. The other main electrode, or emitter, of transistor 46 is connected to switch 18.

In operation, the applied line current, which it will be recalled may vary over a substantial range of voltages, is applied to diode 44 wherein it is converted from an alternating current to a pulsating unidirectional current. Resistor 48 serves as a current limiting resistor and prevents excessive current from being drawn by the appliance during initial charging of capacitor 49, or in the event that a short circuit should develop within the shaver. Switch 18 serves as a user-actuated ON-OFF switch for interrupting the application of alternating current to diode 44.

The unidirectional pulsating current developed as a result of the rectifying action of diode 44 is applied to capacitor 49 by way of the main electrodes of transistor 47, which functions as a switch device having a conduction state dependent on the bias applied to its base. When transistor 47 is biased into saturation current flows through diode 44 and into capacitor 49, charging that element up to a peak voltage level dependent on that of the charging current then being applied. When transistor 47 is biased into cut-off, the charging current is terminated and capacitor 49 remains charged at the voltage level reached during the previous charging cycle. Motor 30, by reason of its shunt connection across capacitor 49, operates from the continuous unidirectional current resulting from discharge of the capacitor.

In accordance with the invention, the voltage level of the unidirectional current developed by capacitor 49 for operation of motor 30 is maintained at a constant predetermined level by selectively conditioning transistor 47 to saturated and cut-off states according to the instantaneous voltage level of the pulsating unidirectional current developed at the cathode of diode 44. In the present embodiment this is accomplished by resistors 50 and 51, which sample the instantaneous voltage level of this pulsating current and apply a portion thereof to the anode of zener diode 45. The ratio of resistances between resistors 50 and 51, and the conduction threshold of zener diode 45, are selected such that when the instantaneous voltage level of the current pulse appearing at the cathode of diode 44 corresponds to a desired predetermined peak voltage level to be applied to capacitor 49, zener diode 45 becomes conductive. The current flow through zener diode 45 causes NPN transistor 46, heretofore biased into cut-off, to be biased into saturation. The resulting low-impedance path between the collector and emitter of transistor 46 serves to effectively ground the base of transistor 47, biasing that device into cut-off notwithstanding the positive bias previously supplied by way of resistor 52.

Zener diode 45 continues to conduct and transistor 47 continues to be biased in a cut-off state for so long as the voltage level at the cathode of diode 44 exceeds the predetermined maximum voltage amplitude desired for current pulses applied to capacitor 49. However, when the voltage level falls below the predetermined maximum level, the proportionate voltage appearing across zener diode 45 is no longer sufficient to sustain conduction in that device and transistor 46 is again biased into cut-off, allowing transistor 47 to again be biased into saturation by resistor 52. As a result, current is again allowed to flow into capacitor 49 to reestablish the charge state thereof, motor 30 having in the interim partially depleted the charge.

It will be appreciated that the effect of capacitor 49 is to act as an energy storage device, providing from applied current pulses a constant unidirectional current suitable for application to motor 30. The average voltage level of this unidirectional current is dependent on the capacity of the capacitor, the current drain of the motor, and the maximum voltage level of the applied pulses. In practice the average voltage level is slightly less than the peak value of the applied pulses by reason of the partial discharge of the capacitor in the non-charging intervals existing between pulses. In fact, the predetermined maximum peak voltage level of the current pulses applied to capacitor 49 is selected for a given capacitor to obtain a predetermined average voltage level for the constant unidirectional current corresponding to the nominal operating voltage requirement of motor 30. Generally speaking, the larger the capacity of the capacitor selected, the less the voltage drop between charging pulses, the lower the ripple applied to the motor, and the lower the capacitor charging pulses need be.

Figure 5:
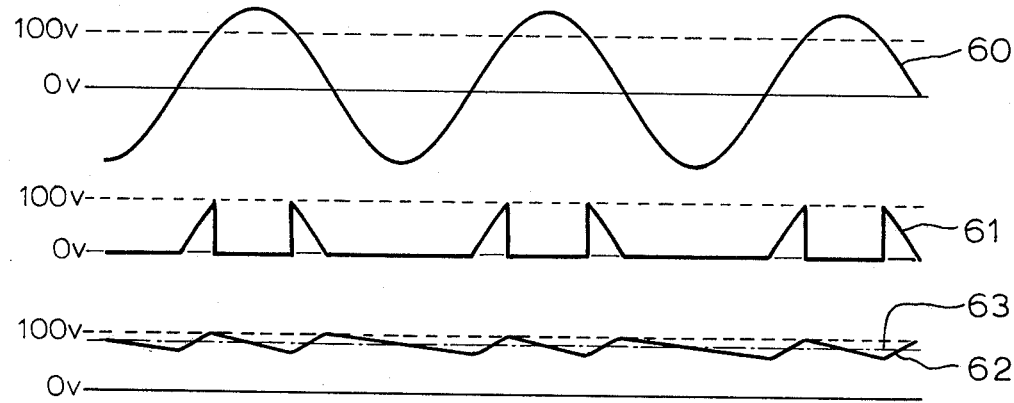
FIG. 5 depicts various waveforms useful in explaining the operation of the electrical circuit of FIG. 4 at 120 VAC.

In a representative application, operation of the shaver from input voltages ranging from 100 volts to 270 volts may be obtained by selecting motor 30 to have a nominal operating voltage of slightly less than 100 volts DC. The conduction threshold of zener diode 45 and the relative resistances of resistors 50 and 51 are then selected such that zener diode 45 will conduct when the instantaneous voltage level at the cathode of diode 44 exceeds 100 volts. As shown by waveforms 60 and 61 in FIG. 5, which depict the applied alternating current line voltage and the charging current applied to capacitor 49, respectively, the conduction of zener diode 45 at voltages in excess of 100 volts results in spaced current pulses having a peak voltage level of 100 volts being applied through transistor 47 to capacitor 49. This results, as shown by waveform 62, in a peak voltage level across capacitor 49 of 100 volts and a slightly lower average voltage level for the continuous unidirectional current therefrom, as represented by the dotted line 63. Motor 30 is ordinarily designed to operate at nominal speed at this average voltage level.

Figure 6:
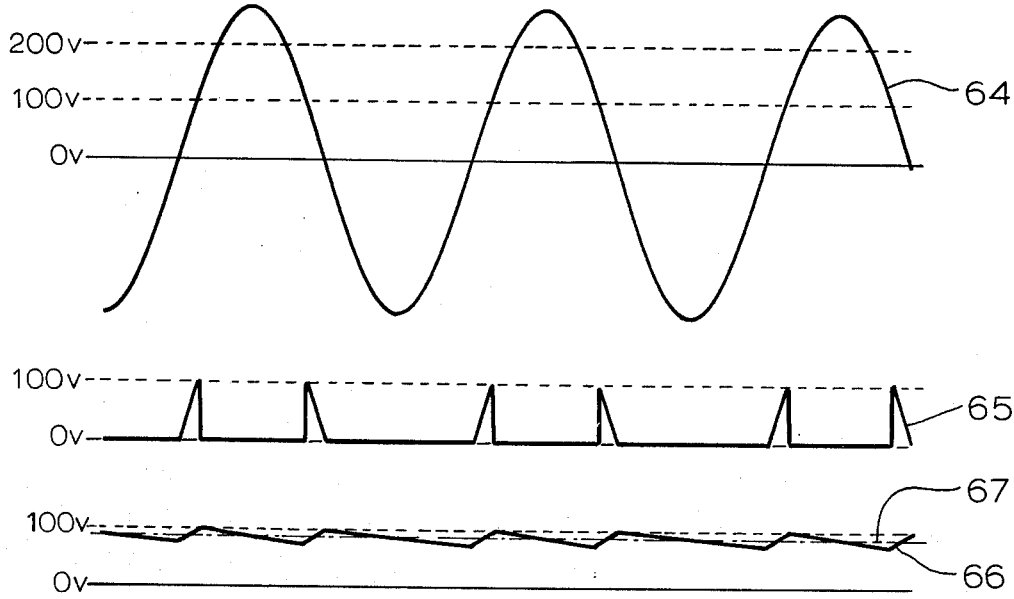
FIG. 6 depicts various waveforms useful in explaining the operation of the electrical circuit of FIG. 4 at 240 VAC.

Referring to FIG. 6, which depicts operation at a higher line voltage of 240 VAC, as represented by waveform 64, the conduction threshold of zener diode 45 is reached earlier for an applied alternating current of greater amplitude. This results in 100 volt current pulses of slightly reduced width being developed for application to capacitor 49 as shown by waveform 65. As before, these current pulses cause a continuous unidirectional direct current to be developed by capacitor 49 having a peak voltage level of 100 volts, corresponding to the maximum voltage level of the applied pulses, as shown by waveform 66. Again, the average voltage level of the continuous current is slightly less as shown by dotted line 67, because of the interim discharge current drawn by motor 30.

Figure 7:
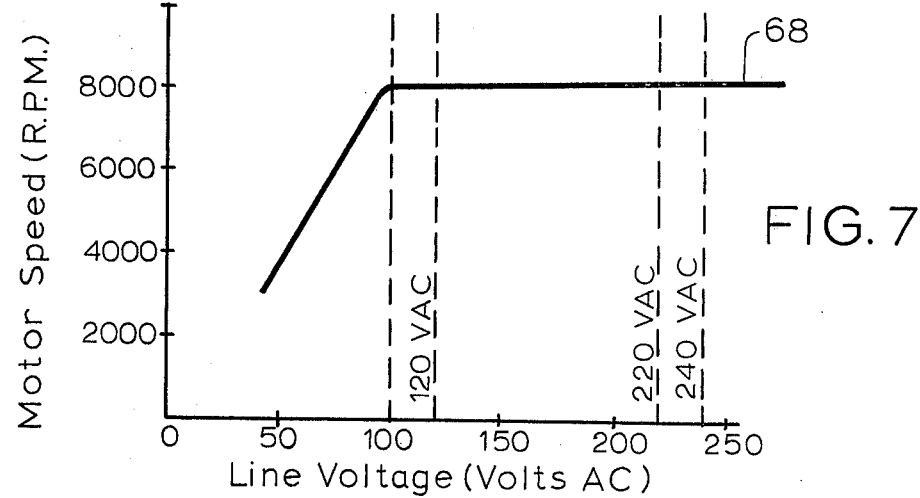
FIG. 7 is a graphical presentation depicting the output speed of the motor of FIG. 4 as a function of applied line voltage.

Thus, motor 30 receives the same operating current, and hence operates at the same speed, notwithstanding large variations in applied line voltages. This is seen in FIG. 7, wherein the plot 68 represents a typical application wherein the motor has a nominal speed of 8000 rpm with 100 volts DC applied to is terminals. By reason of the circuit means of the invention maintaining the average voltage level across capacitor 49 constant, the 8000 rpm speed is obtained for both line voltages of 120 volts, as found in the United States and North America, and for line voltages of 220 volts and 240 volts, as commonly found in Europe and other parts of the world. In fact, constant speed operation is obtained for all line voltages over 100 volts up to the design maximum voltage of the shaver, as determined by the capability of the various components used in the circuit to handle the increased voltages and reduced pulse width. In the present instance the shaver is design-limited to operation at line voltages up to 270 volts, it being considered unlikely that voltages in excess of this level will be encountered by the user.

Since the series switching transistor 47 is operated in either a saturated state or a non-saturated state, heat dissipation in that device is minimal. This obviates the need for a heat sink or thermal insulation within the shaver, and results in optimum in efficiency in operation. For what heat may be generated, it is contemplated that a thermistor may be incorporated in the voltage divider, either in place of one of resistor 50 and 51, or as an additional element, to compensate for variations in the avalanche point of zener diode 45 and the other circuit components attributable to heat.

It will be appreciated that while a control circuit comprising a zener diode and single transistor has been shown for controlling the switching transistor, other circuits can be utilized to obtain the same result. For example, it may be possible to utilize an integrated circuit-type voltage comparator with suitable logic and output circuitry. Furthermore, it may be possible to utilize another type of switching device in place of NPN transistor 47, such as silicon controlled rectifier (SCR) or a triac provided these devices are provided with suitable means for extinguishing or rendering them nonconductive at appropriate points in the operating cycle.

While a half-wave rectifier consisting of a single diode 44 has been shown in the illustrated embodiment, it will be appreciated that a full-wave rectifier may also be used. This would have the advantage of increasing the repetition rate of the current pulses applied to capacitor 49, since each half cycle appearing at the output of the rectifier would be of proper polarity, instead of alternate half cycles as in the illustrated embodiment. As a result capacitor 49 could have a smaller capacity for reduced size and cost, and the peak currents handled by transistor 47 in charging the capacitor would be reduced.

Thus, an electric shaver 10 has been shown and described which may be powered from AC supply lines having a wide range of voltage levels. This is done automatically, without any preselection of voltage on the part of the user, it being only necessary for him to plug the line cord of the shaver into an appropriate electrical outlet. The shaver always operates at optimum efficiency since motor 30 is supplied with the correct terminal voltage at all times, notwithstanding higher than normal or lower than normal line voltages. A minimal number of additional components are required, and those components which are utilized are all of an inexpensive commonly available type, making the invention particularly attractive for use in the highly competitive consumer appliance industry. By reason of the switching action of the circuit means, heat dissipation within the shaver is held to a minimum for maximum efficiency and component life.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spiring and scope of the invention.

I claim:

1. In an electrical appliance of the type including a DC motor operable from an applied unidirectional current having a predetermined nominal voltage level, circuit means for operating said motor from an alternating current source having a predetermined range of voltage levels, said circuit means comprising, in combination:

energy storage means including a capacitor for producing from a series of applied current pulses having a predetermined peak voltage amplitude a unidirectional current at said predetermined nominal voltage level of said motor for application to said motor;

means including a switch device having main electrodes coupled between said alternating current source and said energy storage means and a control electrode for supplying current from said alternating current source to said energy storage means, the conduction state of said switch device being dependent on a control effect applied to said control electrode; and control circuit means responsive to the instantaneous voltage level of said alternating current source for applying a control effect to said control electrode, said control effect rendering said switch device conductive to apply current from said alternating current source to said energy storage means during those portions of the alternating current cycle when the instantaneous voltage level of said alternating current does not exceed said predetermined peak voltage amplitude, and non-conductive during those portions of the alternating current cycle when the instantaneous voltage level of said alternating current exceeds said predetermined peak voltage amplitude.

2. An electrical appliance as defined in claim 1 wherein said switch comprises a transistor, said main electrodes comprise the emitter and collector of said transistor, and said control electrode comprises the base of said transistor.

3. An electrical appliance as defined in claim 1 wherein the instantaneous voltage level of said alternating current source varies sinusoidally, and wherein said control circuit renders said switch device conductive on at least a portion of the leading and trailing edges of at least one-half cycle of said sinusoidal voltage variation.

4. An electrical appliance as defined in claim 3 wherein said circuit means include rectifier means coupled between said alternating current source and said switch device for developing from said alternating current a unidirectional pulsating current of predetermined polarity, and wherein said switch device is rendered conductive on at least portions of both the leading and trailing edges of each cycle of said unidirectional pulsating current.

5. An electrical appliance as defined in claim 4 wherein said control circuit includes an avalanche diode device, said device becoming conductive only when the instantaneous voltage level of said unidirectional pulsating current exceeds said predetermined peak voltage amplitude required for production of said unidirectional current for said motor.

6. An electrical appliance as defined in claim 5 wherein said control circuit further includes an amplifier device coupled between said avalanche diode device and said control electrode of said switching device for rendering said switching device non-conductive when said avalanche diode device is in said conductive state.

7. An electrical appliance as defined in claim 6 wherein said control circuit further includes a voltage divider coupled across the output of said rectifier means, said avalanche diode device comprises a zener diode, said amplifier device comprises an additional transistor having input, output, and common electrodes, and wherein the output tap of said voltage divider is coupled through said zener diode to said input electrode, and wherein the output electrode of said transistor is coupled to said control electrode of said switching device.

8. In an electric shaver of the type having a DC motor operable from an applied unidirectional current having a predetermined nominal voltage level, circuit means for operating said electric motor from an alternating current source having a predetermined range of voltage levels, said circuit means comprising, in combination;

energy storage means including a capacitor for producing from a series of applied pulses of predetermined voltage amplitude a unidirectional current at said nominal motor operating voltage for application to said motor;

means including a switch device having main electrodes coupled between said alternating current source and said capacitor and further having a control electrode for supplying current from said alternating current source to said capacitor, the conduction state of said switch device being dependent on a control signal applied to said control electrode; and control circuit means responsive to the instantaneous voltage level of said alternating current source for applying a control signal to said switch device, said control signal rendering said switch device conductive to apply current from said alternating current source to said capacitor during those portions of the alternating current cycle when the instantaneous voltage level of said alternating current does not exceed said predetermined peak voltage amplitude, and non-conductive during those portions of the alternating current cycle when the instantaneous voltage level of said alternating current exceeds said predetermined peak voltage amplitude.

9. An electric shaver as defined in claim 8 wherein said control circuit means further comprise rectifier means coupled between said alternating current source and said switch device for developing from said alternating current a pulsating unidirectional current of predetermined polarity, and wherein said switch device is rendered conductive on at least portions of both the leading and trailing edges of each half cycle of said pulsating unidirectional current.

10. An electric shaver as defined in claim 9 wherein said switch device comprises a transistor and said control circuit means include a zener diode coupled between said rectifier means and said control electrode, said zener diode becoming conductive to render said switch device nonconductive when the instantaneous voltage level of said pulsating unidirectional current exceeds said predetermined peak voltage amplitude of said current pulses applied to said capacitor.

11. An electric shaver as defined in claim 10 wherein said control circuit means further include an amplifier device coupled between said zener diode and said control electrode of said switch device for rendering said switch device non-conductive when said zener diode is in said conductive state.

12. An electric shaver as defined in claim 11 wherein said control circuit means further comprise a voltage divider coupled across the output of said rectifier means, said amplifier device comprises an additional transistor having input, output, and common electrodes, and wherein the output tap of said voltage divider is coupled through said zener diode to said input electrode, and wherein the output electrode of said transistor is coupled to said control electrode of said switch device.

* * * * *